United States Patent [19]

Van Deursen

[11] 4,386,740
[45] Jun. 7, 1983

[54] FOOD PROCESSOR

[75] Inventor: Gary E. Van Deursen, Upper Saddle River, N.J.

[73] Assignee: General Electric Company, New York, N.Y.

[21] Appl. No.: 272,674

[22] Filed: Jun. 11, 1981

[51] Int. Cl.³ .............................................. B02C 18/00
[52] U.S. Cl. ................................... 241/93; 241/285 A
[58] Field of Search ..................... 241/169.1, 88.4, 93, 241/273.1, 273.2, 273.3, 233.4, 285 R, 285 B, 285 A

[56] References Cited

U.S. PATENT DOCUMENTS

| | | | |
|---|---|---|---|
| 913,187 | 2/1909 | Arnstein | 241/93 |
| 2,071,130 | 2/1937 | Coventry | 83/63 |
| 2,596,604 | 5/1952 | Schaeffer | 241/93 X |
| 3,635,270 | 1/1972 | Petroske et al. | 241/93 X |
| 3,907,215 | 9/1975 | Mantelet | 241/88.4 |

Primary Examiner—Mark Rosenbaum
Attorney, Agent, or Firm—John F. Cullen; George R. Powers; Leonard J. Platt

[57] ABSTRACT

The invention relates to a food processer of the slicer/shredder type having a power base L-shaped housing and a second feed chute offset from the upstanding base and rotatably attached to the L-shaped housing to extend above it in an operative positive position over the L with the chute foldable in a box-like position for compact and convenient storage. A cylindrical hollow cutter disposed in one end of the chute and an axially aligned cylindrical outlet with a detachable spout is disposed adjacent the cutter. A clutch around the shaft rotatably connects the chute and housing together and the shaft is slanted down up to 10° below and over the L-portion with housing and chute having abutting spaces offset substantially the same amount from the vertical for food to easily exit the outlet. An interlocking control connects the clutch so the chute is partly rotated from the vertical operative position in one direction about the shaft for removal and cleaning and/or it may be rotated substantially 180° in the other direction from the vertical while aligning the chute and housing together box-like for compact inoperative storage. A pusher is provided in the chute to force food against the cutters and locking the chute in inoperative position.

5 Claims, 3 Drawing Figures

FOOD PROCESSOR

BACKGROUND OF THE INVENTION

1. Field of the Invention

The invention relates to a food processor of the slicer/shredder type having a power base L-shaped housing with a second feed chute housing rotatably attached to the L-shaped housing to extend above it in an operative position over the L with the chute foldable into a box-like position for compact and convenient storage.

2. Description of the Prior Art

It is known to use food processors, a device fitting in the speed range between blenders and mixers, as a multi-purpose kitchen apparatus which uses interchangeable rotary tools as various attachments for blending, mixing, grating, grinding, chopping, slicing, whipping, and other operations in a short time. These processors have become a commonly used kitchen appliance. Also the old hand grinders that mounted on the kitchen table with interchangeable outlet screens usually turned a screw thread to feed vertically inserted food axially outward through the screen to provide ground meat, such as hamburger, has been in use for decades. Usually butcher shops have such power operated machines but the principle is the same in this relatively slow moving grinder. Because certain jobs are better done at relatively slow speeds e.g. 125 rpm, between the two has evolved the slicer/shredder which usually comprises a horizontally rotatable cylindrical cutter whereby food is pushed into a hopper against the rotating cutter, passing through the cutter to exit a side outlet to process the food in still a different manner. Various cutters may be interchangeably mounted on the driven spindle to provide various cuttings whether turned by hand or motor driven. Generally these are rather tall machines using much counter space thus being rather bulky. Various devices have attempted to provide compactness by providing folding parts to obviate the bulkiness of an otherwise useful appliance. Of course all food handling processors must have removable parts for cleaning.

An object of the invention is to provide a food processor of the general slicer/shredder type with an improved arrangement of parts for the user to swing the chute up into operative position or completely rotate it downward to locked position whereby the entire appliance provides a compact low box-like profile.

Another object is to provide such a processor that the user may swing the food receiving chute into an upright operative position or selectively rotate the chute one way for removal for cleaning or the other way for a complete reversal so the processor forms a box-like compact inoperative low profile storage position.

A final object is to provide a slicer/shredder which takes up little space on the kitchen counter and is conveniently changed from operative to inoperative position, comes apart for cleaning, and overall presents a low profile compact box-like storage position by simple rotation.

SUMMARY OF THE INVENTION

Briefly described, the invention is directed to a food processor of the slicer/shredder type that comprises an L-shaped upstanding base housing with an electric motor and a rotatable, generally horizontal, shaft in the upper housing portion and with its axis aligned to extend centrally or aim over the L-portion but supported in the housing. A separate chute offset from the upstanding base is operatively locked to and extends above and is long enough to substantially fill the space over the L to the top of the base. Both housing and chute are preferably rectangular, the chute having a channel through it with a pusher to move the food therethrough. A cylindrical hollow removable cutter is disposed in one end of the chute with a driving connection between the shaft and the cutter. The chute has an axially aligned cylindrical outlet at and adjacent the cutter and a clutch around the shaft rotatably connects the offset chute and housing together at a common wall. Preferably, the contacting vertical walls between the chute and housing are slanted off the vertical and the motor driven shaft is slanted down an equivalent amount—up to 10° off the horizontal so that the entire device is slightly tilted forward when operating so the processed food more easily exits the outlet. A clutch around the shaft rotatably connects the chute and housing together and a button control means connects with the clutch whereby the chute may be partly rotated in one direction from the vertical about the shaft for removal and cleaning and/or it may be rotated substantially 180° in the other direction from the vertical for aligning and locking the chute and housing together in a box-like configuration for compact inoperative storage and low profile. Thus, the main object of the invention is to provide a food processor of the slicer/shredder type which is formed to provide a convenient side-by-side motor housing and food chute with the chute in the up or operative position and which chute is rotated to be removed for cleaning or down for locking and storage position to present a compact low profile box-like appliance.

DESCRIPTION OF THE PREFERRED EMBODIMENT

Figure 1:
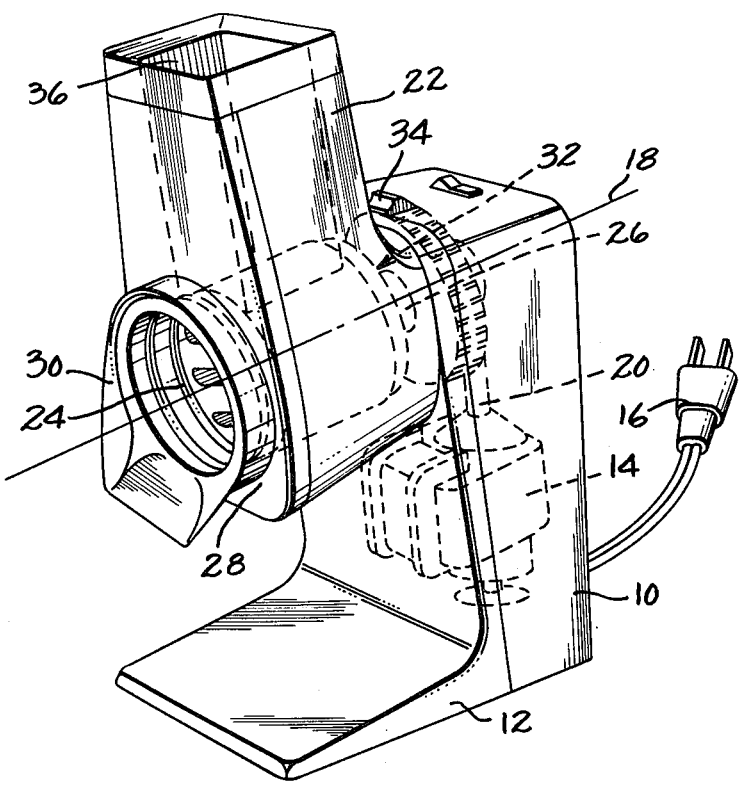
FIG. 1 is a perspective view showing the device in operative position with internal structure shown dotted.
Figure 2:
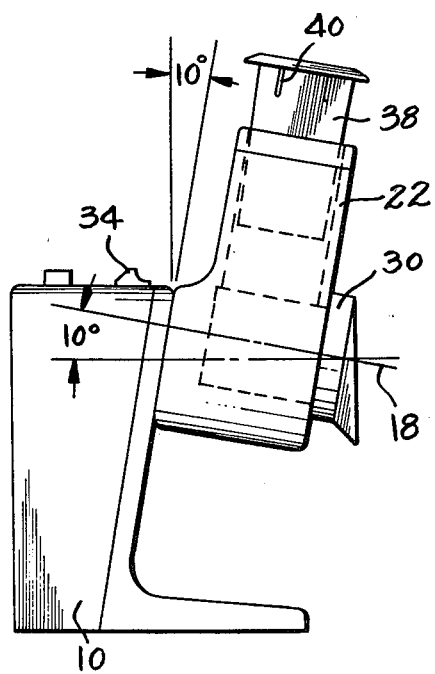
FIG. 2 is a similar side elevation also showing the device in operative position.
Figure 3:
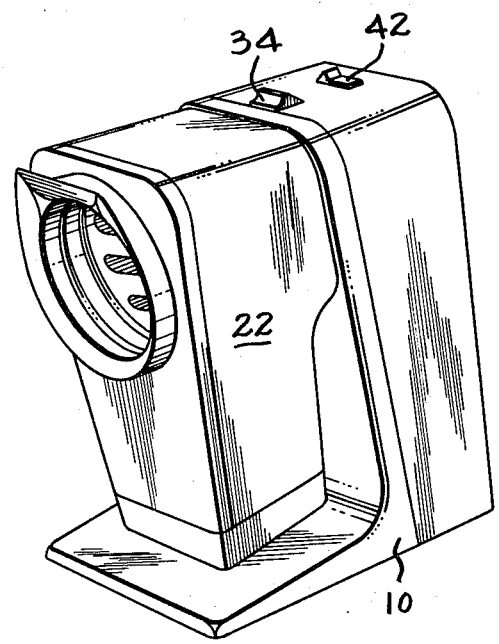
FIG. 3 is a perspective showing the chute rotated to inoperative position into box-like compact storage position.

Referring to FIG. 1, there is shown a food processor of the slicer/shredder type with an upstanding L-shaped power base housing 10 with a thin L supporting leg 12 of the general type in numerous appliances such as drip coffeemakers and provided for stability as will be apparent. Disposed in the upstanding base portion 10 is internal electric motor 14 powered from cord 16 and the base housing has a rotatable generally horizontal shaft 18 that is drivingly connected by gears or belt 20 with the motor. The axis 18 is aligned in the upper housing portion such that, if extended, it would lie centrally over the leg 12 both along the leg and midway between its edges. Preferably, the axis is slanted down up to 10° below and over the L-portion as seen in FIG. 2. The term "generally horizontal" is intended to include this variation since the actual preferred dip of shaft 18 is 7°. In order to provide slicing/shredding capabilities, a separate offset chute 22 is operatively locked by a clutch to the adjacent housing 10 such that it extends above and is long enough to substantially fill the vertical space over the leg 12 to the top of the base 10 when in folded position as in FIG. 3. For cutting, a cylindrical known detachable hollow cutter 24 is connected in one end of the chute 22 and a coupling or driving connection such as spline connection 26 is located between the shaft and the cutter. For exiting processed food, an outlet 28 is axially aligned with driving shaft 18 in the chute vertical wall and adjacent cutter 24. For convenience, the housing and chute are rectangularly-walled members with outlet 28 being generally circular and provided with a formed detachable guiding spout 30 for directing the food downwardly into an adjacent bowl not shown. The connection between chute 22 and housing 10 is an internal clutch generally indicated at 32 of the type shown in co-pending application Ser. No. 6/272,676 of common assignment and filed concurrently. This clutch means 32 rotatably connects the chute and housing at their abutting faces as shown. A control lock button 34 connects adjacent the internal clutch 32 such that the chute 22 may be partly rotated in one direction from its vertical position as shown to about 45° counter-clockwise whereby the entire chute 22 and its enclosed cutter are detached from housing 10. Spout 30 and cutter 24 may also be detached from the chute 22 for cleaning and/or replacing with a different cutter as appropriate. For storage, the clutch also permits rotation substantially 180° in the other or clockwise direction from the vertical so it is aligned and internally locked to the housing 10 in a generally boxlike configuration as shown in FIG. 3. This provides a integral compact inoperative low profile storage boxlike configuration to conveniently slide under the cabinets in a conventional kitchen.

The parts are preferably rectangular for a neat boxlike and pleasing appearance and the chute is provided with a rectangular channel 36 extending therethrough to the lower cutter with a matching axially slideable pusher 38 that may also serve as a measuring cup and has ribs or equivalent means 40 for frictionally holding in the channel when the appliance is folded into FIG. 3 stored position.

In operation, the folded integral compact appliance of FIG. 3 is turned upright into its operative FIG. 1 position by operating button 34 and rotating chute 22 into its upright locked position and turned on by button 42 and operated by pushing food through channel 36. The preferred offset or tilted alignment, as shown in FIG. 2, permits the processed food to more easily exit through the outlet into the adjacent bowl. When processing is complete, operation of button 34 allows the chute to be rotated e.g. counterclockwise further past the vertical to about 45° where it is removable by the internal clutching for cleaning. Reattachment of the chute to housing 10 is made at the same removal or 45° position and then the chute completely rotated in the opposite e.g. clockwise direction or 180° from the vertical down into the position of FIG. 3 where the housing and chute are automatically locked together for convenient storage in an integral box-like configuration of low profile. The arrangement of the offset chute 22 over the low leg 12 is over-center to provide a very stable operating appliance while also permitting storage space for the chute to rotate into inoperative position over the L as in FIG. 3 for compact low profile storage.

While I have hereinbefore shown a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A food processor of the slicer/shredder type comprising,
    an L-shaped upstanding base housing with a top and an electric motor therein,
    a rotatable generally horizontal shaft in the upper housing portion drivingly connected with said motor and with its axis aligned to extend centrally over the L,
    a separate chute offset from the upstanding base and operatively locked to extend above and long enough to substantially fill the space over the L to the top of said base,
    a cylindrical hollow cutter disposed in one end of said chute,
    a driving connection between said shaft and cutter,
    an axially aligned outlet in said chute at and adjacent said cutter,
    a clutch around said shaft rotatably connecting said chute and housing and,
    control lock means connecting adjacent said clutch whereby the chute may be partly rotated in one direction from vertical about the shaft for removal and may be rotated substantially 180° in the other direction from vertical for aligning and locking said chute and housing together box-like for compact inoperative storage.

2. Apparatus as described in claim 1 wherein said housing and chute are rectangularly walled,
    said outlet in said chute adjacent said cutter being generally circular, and
    guiding spout means detachably connected at said outlet to direct food therefrom.

3. Apparatus as described in claim 2 wherein
    said shaft is slanted down up to 10° below and over said L-portion, and
    said upstanding base and chute have their abutting faces offset substantially the same amount from the vertical over the L-portion so the processed food more easily exits the outlet.

4. Apparatus as described in claim 3 having a rectangular channel through said chute to said cutter and,
    matching pusher means frictionally held in said channel and axially slidable to force food therethrough against said cutter.

5. Apparatus as described in claim 1 wherein said shaft is slanted down up to 10° below and over said L-portion, and said upstanding base and chute have their abutting faces offset substantially the same amount from the vertical over the L-portion so the processed food more easily exits the outlet.

* * * * *